Aug. 6, 1963  R. C. DREIBELBIS  3,100,078
THERMOSTATIC CONTROL MECHANISM
Filed May 5, 1960  2 Sheets-Sheet 1
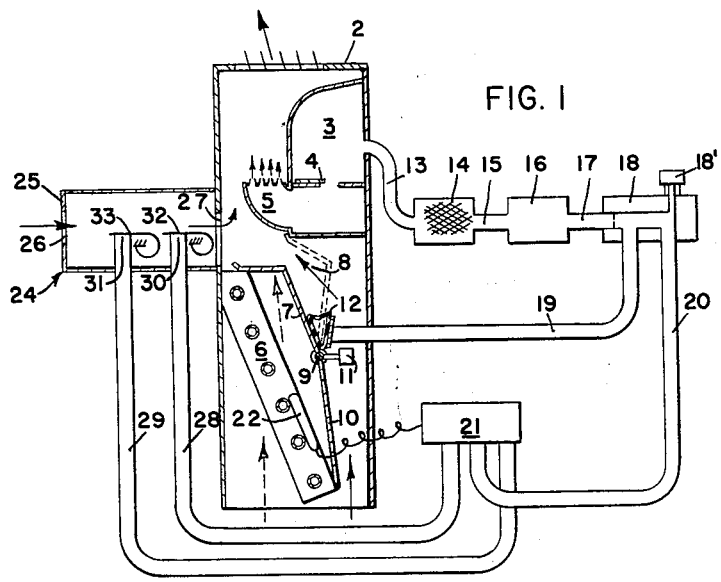
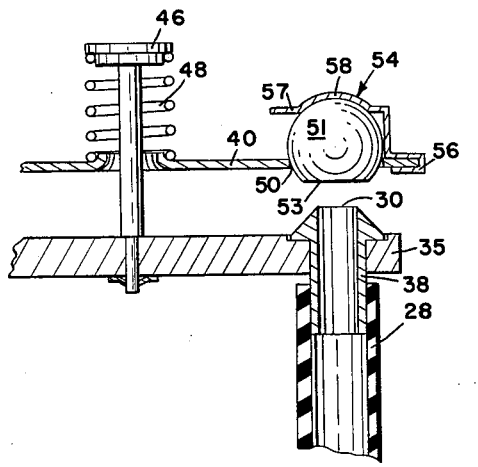
*INVENTOR.*
RICHARD C. DREIBELBIS
BY *Herman Seid*
ATTORNEY.

Aug. 6, 1963  R. C. DREIBELBIS  3,100,078
THERMOSTATIC CONTROL MECHANISM
Filed May 5, 1960  2 Sheets-Sheet 2
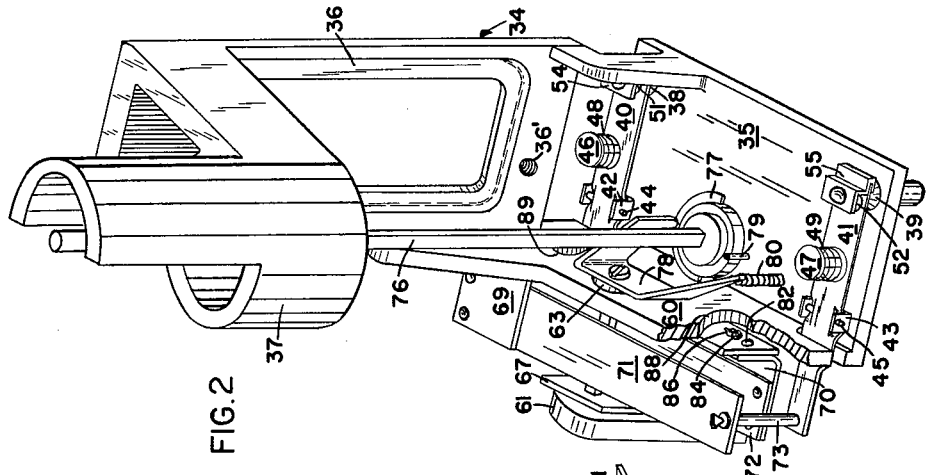
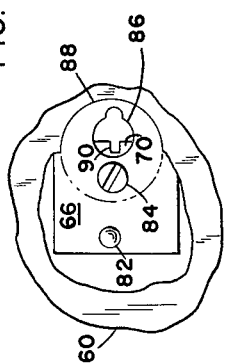
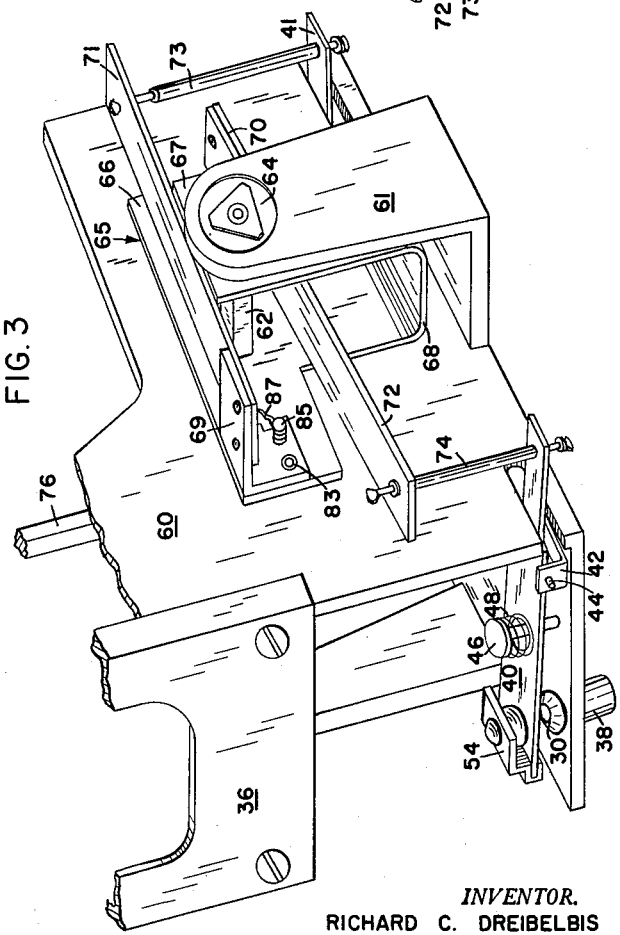
INVENTOR.
RICHARD C. DREIBELBIS
BY Herman Seid
ATTORNEY.

United States Patent Office 3,100,078
Patented Aug. 6, 1963

3,100,078
THERMOSTATIC CONTROL MECHANISM
Richard C. Dreibelbis, Fairlawn, N.J., assignor to Carrier Corporation, Syracuse, N.Y., a corporation of Delaware
Filed May 5, 1960, Ser. No. 27,007
11 Claims. (Cl. 236—47)

This invention relates to a control mechanism and more particularly to a novel bleed-type control mechanism of bimetallic design.

An important application of the present invention is in the field of air conditioning. In the copending application of Milton H. Coleman and Carlyle M. Ashley, Serial No. 26,986, filed May 5, 1960, the same assignee as in the instant case, there is disclosed an induction type air conditioning system wherein outside air is treated at a central station and then distributed at relatively high static pressure and at relatively high velocity to a plurality of units each located in an area to be conditioned. The high pressure air supplied to each unit is discharged therein through discharge nozzles and in this manner induces secondary air from the area served by the unit. The primary or conditioned air and the secondary or induced air are mixed within the unit and are then supplied to the area to be conditioned. Within each unit is a heat exchanger. Preferably, during winter operating conditions, a hot conditioning medium may be supplied to the heat exchanger while, during summer operating conditions, a cold conditioning medium may be supplied to the heat exchanger. It will be understood under some circumstances piping may be so arranged that both hot and cold conditioning medium may be available at each unit.

It is preferred that the supply of conditioning medium supplied to each heat exchanger be substantially constant, that the supply of primary air supplied to each unit also be substantially constant, and that the quantity of induced air passing in heat exchange relation with the heat exchanger be varied by means of a damper in the unit which permits a desired quantity of induced air to pass through the heat exchanger of each unit or to bypass the heat exchanger as desired in order to vary the amount of total heat applied to or removed from the induced air while maintaining the total quantity of air discharged from the unit substantially constant.

The damper disclosed in the aforementioned patent application is actuated by a control system including a bellows provided with primary air under a predetermined control pressure from the plenum chamber of each unit. Air passes from the plenum chamber through a filter to an air pressure regulator. From the regulator the air passes through a sharp-edged orifice and is diverted to one of two outlets. For non-changeover operation, varying air pressure is diverted from downstream of the orifice to the expansible bellows. For changeover operation one outlet near the orifice vena contracta to facilitate reaching the lower expansible member pressures is connected to the expansible bellows for actuating the damper and the other outlet, downstream of the vena contracta, is connected to a changeover valve. The changeover valve includes a thermal actuator which senses the approximate temperature of the conditioning medium flowing through the heat exchanger and causes the air passing through the changeover valve to flow to either the heating section or the cooling section of the bleed-type thermostatic control mechanism in such control system dependent upon winter or summer operating conditions. The air flowing to the control mechanism is passed to the atmosphere from either the heating portion or the cooling portion thereof depending upon the operating condition.

Present control mechanisms are unable to satisfactorily regulate the discharge of air from such control system. The use of a separate heating control and a separate cooling control substantially increases the cost of the control mechanism and does not provide the desired accuracy of regulation.

The primary object of this invention is to provide an improved bleed-type control mechanism.

An object of this invention is to provide an improved dual-bleed control mechanism of bimetallic design having means for separately adjusting the operating position of each individual bimetallic element and also having means for simultaneously adjusting the positions of both bimetallic elements on demand for a change in room (secondary air) temperature.

Another object of this invention is to provide a bleed-type control mechanism having a novel seating member and mounting therefor for closing a bleed port.

This invention relates to a dual-bleed control mechanism for use in a heating-cooling type control system comprising a support, a first nozzle on the support having a discharge port, a second nozzle on said support having a discharge port, a bracket pivotally mounted on the support, a first bimetallic element adjustably secured to the bracket, a second bimetallic element adjustably secured to said bracket, first means operatively connected to the first bimetallic element for closing the first port, second means operatively connected to the second bimetallic element for closing the second port, and means for moving the bracket to simultaneously adjust the first means and the second means.

This invention also relates to a bleed-type control mechanism for use in a control system comprising a support, means defining a port in the support, said port adapted to be connected to a source of control air at a predetermined pressure, a bimetallic element on the support, means for opening and closing the port to the atmosphere operatively connected to the bimetallic element, the opening and closing means including a member having an opening therein adjacent the port, a seating member in said opening having a planar face adapted to engage and seal the port, and spring means for retaining the seating member in said opening to accommodate universal adjustment of the planar face of the seating member to the plane of the port.

The invention will be described in greater detail in connection with the accompanying drawings illustrating a preferred embodiment of the invention by way of example and wherein:

FIGURE 1 is a diagrammatic view of a control arrangement embodying the present invention;

FIGURE 2 is a right rear perspective view of the control mechanism of the present invention with the casing removed and with a portion of the central wall broken away;

FIGURE 3 is a left front perspective view of the control mechanism of the present invention on an enlarged scale illustrating the mounting of the two bimetallic elements and with parts broken away;

FIGURE 4 is an enlarged fragmentary view in section of the means mounting the spherical ball seating member; and FIGURE 5 is an enlarged detail view of the means for adjusting one bimetallic element.

In FIGURE 1 there is shown schematically a room unit provided with the control system of the present invention. The room unit includes casing 2 in which is placed plenum chamber 3. The plenum chamber is adapted to be connected to a source of primary air. Balancing damper 4 within the plenum chamber regulates the pressure of air supplied to discharge means or nozzles 5. Mounted in casing 2 is heat exchanger 6. The discharge of primary air within the casing through nozzles 5 induces room air through the bottom of the casing into heat exchange relation with conditioning medium passing through heat exchanger 6.

Passage of air through heat exchanger 6 is regulated by means of an actuated member or damper 7. When the damper is open, as shown in solid lines in FIGURE 1, secondary air will flow through bypass passage 8 and when the damper is closed, as shown in dotted lines in FIGURE 1, secondary air will flow through the heat exchanger. Wall 10, secured within casing 2, prevents short circuiting of bypass air through heat exchanger 6 when damper 7 is open. Damper 7 is secured to shaft 9 which is pivotally supported in brackets (not shown) within casing 2. The damper is urged clockwise, as seen in FIGURE 1, by gravity, as by means of a counterbalance 11 secured to shaft 9.

The means for urging damper 7 counterclockwise, as seen in FIGURE 1, toward the open position bypassing secondary air through passage 8 comprise an expansible member or bellows 12 and control therefor. Control air for actuating the bellows is preferably supplied from plenum chamber 3. Air flows from plenum chamber 3 through line 13 to filter 14, which eliminates dust particles from the air. The air then passes through line 15 to the air pressure regulator 16 which will maintain a constant downstream pressure. The air passes through line 17 to restriction member 18. Control air pressure is transmitted through line 19 to the expansible member or bellows 12 for actuating the same. One wall of bellows 12 is fixed with respect to wall 10 of the induction unit; the other wall of bellows 12 is actuable to move the damper 7. Relief valve 18' is provided on restriction member 18 to relieve excess pressure.

Restriction member 18 is connected to changeover valve 21 by line 20. The changeover valve 21 includes a thermal actuator 22 suitably mounted in heat exchange relation with the heat exchanger 6. The changeover valve senses the approximate temperature of the conditioning medium flowing through heat exchanger 6 and diverts the air to either the heating portion or the cooling portion of control mechanism 24.

Control mechanism or thermostat 24 includes a casing or housing 25 having an inlet 26 in communication with the room air and an outlet 27. Thermostat 24 is connected to changeover valve 21 by means of heating line 28 and cooling line 29. The lines 28 and 29 open within the casing 25 in a heating port 30 and a cooling port 31. The heating bleed control 32 and the cooling bleed control 33 operate to selectively bleed air to the atmosphere depending upon the different operating conditions.

Referring to FIGURE 2 there is shown a perspective view of the thermostat. The components of the thermostat are mounted upon a support or frame 34 comprised of a base portion 35, a support wall 36, and an upper bearing portion 37. The support may be formed in one piece or can be formed of separate elements connected together. Suitable fastening means are adapted to extend through openings 36' in wall 36 to secure the thermostat to casing 2. Nozzles 38 and 39 which are adapted to be connected to lines 28 and 29, respectively, are affixed in suitable openings in the base 35. The open end of each nozzle defines a port 30 and 31, respectively. The means for establishing the extent of closure of ports 30, 31 comprises plates 40, 41 pivotally mounted on the base 35 and with spherically pivoted seating members on each plate. Each bracket 42, 43 suitably affixed to base 35 journals therein a pivot 44, 45 to which the plates 40, 41 are respectively secured. Each plate is urged downwardly towards the closed position by means comprising stems 46, 47 suitably secured in place to base 35 and a spring 48, 49 disposed between the head of stem 46, 47 and the top of plate 40, 41.

The seating members for closing the ports 30 and 31 respectively comprise balls 51 and 52 uniquely mounted on the plates 40 and 41 respectively. As can be clearly seen in FIGURE 4, the top of nozzle 38 is planar and thus the port 30 lies in a plane. Spherical ball 51 is seated in an opening 50 in plate 40. Spherical ball 52 is mounted in a similar opening in plate 41. The means for holding the balls 51 and 52 in place in the openings in plates 40 and 41 to properly seat and close the ports 30 and 31 comprise retainers 54 and 55. Each retainer is formed from a resilient material and includes a clamp portion 56 affixed to the end of the plate and an upper portion 57. The upper portion has therein a spherical depression 58 adapted to engage the top of the ball valve. To properly adjust planar face 53 of spherical ball 51 it is merely necessary to bear down upon the end of plate 40 (FIGURE 4). The bottom surface of each ball may be similarly adjusted to close each port if face 53 and the end of each nozzle are of mating configurations other than planar. Planar face 53 will engage the top of nozzle 38 and the reaction will force the ball upwardly against the upper portion 57 of resilient retainer 54. The cooperating faces of the upper surface of ball 51 and the lower surface of spherical depression 57 will move with respect to one another and properly seat the ball. The proper position of ball 51 will be maintained by retainer 54.

Extending upwardly from the base 35 is central wall 60 and support wall 61. Shaft 62 is supported in bearings 63 and 64 located in the central wall and support wall respectively. A U-shaped bracket 65 having uprights 66 and 67 and base 68 is affixed to the shaft 62. Preferably the shaft is of non-circular cross-section and each upright 66, 67 has an opening therein of a configuration conforming to the periphery of the shaft. Thus, when the shaft is rotated, bracket 65 will be moved.

Referring to FIGURE 3, the angle members 69 and 70 are mounted on opposite ends of upright 66. Bimetallic element 71 is cantilevered from angle member 69 and bimetallic element 72 is cantilevered from angle member 70. It is noted that the bimetallic elements are mounted one above the other and are cantilevered in opposite directions so as to occupy a minimum of space. The free end of bimetallic element 71 is connected to an end of plate 41 by means of pin 73; likewise the free end of bimetallic element 72 is connected to an end of plate 40 by pin 74. The ends of each pin 73 and 74 are freely movable for a predetermined distance within the bimetallic members 71 and 72 and the plates 40 and 41 to provide lost motion connections between the ends of each pin and the adjacent element 71, 72 or plate 40, 41.

The means for simultaneously adjusting the bimetallic elements comprises a vertical shaft 76, a cam 77, and a cam follower 78. Vertical shaft 76 is journalled in upper bearing portion 37 and base 35 of the frame 34. Cam 77 is affixed to vertical shaft 76 adjacent base 35. Cam follower 78 is fixed to shaft 62 and is adapted to engage the upper surface of cam 77. Spring 80 mounted between the one end of cam follower 78 and the base portion urges the cam follower into engagement with cam 77. The rotation of the cam is maintained within fixed limits by means of stop 79.

Referring to FIGURE 5, there is shown a detail view of the means for separately adjusting one of the bimetallic elements. It is understood that each bimetallic element is mounted so as to be separately adjusted. Rivet 82, 83 pivotally connects angle member 69, 70 and bracket 65. Set screws 84 and 85 extend through suitable openings in the bracket 65 and engage angle members 69 and 70, respectively. Within upright 66 and at each end thereof is a keyhole slot 86, 87. These slots 86 and 87 are accessible through openings 88 and 89 respectively in central wall 60. To adjust bimetallic element 70 it is necessary to loosen the set screw 84. A screwdriver is then extended through opening 88 into keyhole slot 86 and into engagement with recess 90 in angle bracket 70.

Bimetallic element 72 is then pivoted about rivet 82 to its proper adjusted position and is locked in place by tightening set screw 84.

Assuming that the median temperature desired in each area to be conditioned is 75° F., each bimetallic element may be calibrated and preset at the factory to such specification, as explained above. If the room occupant desires another temperature, he may rotate vertical shaft 76 by turning a suitable control knob (not shown). Cam follower 78 is actuated by cam 77 to rotate shaft 62 and pivot bracket 65, thus readjusting the position of each ball 51, 52 with respect to its associated port 30, 31. In this fashion the room occupant may select a room control temperature to suit his taste.

Considering the operation of the control system under summer conditions, control air is supplied from plenum chamber 3 through filter 14 to the pressure regulator 16. Air from regulator 16 then passes through restriction member 18. Pressure downstream of the restriction member is transmitted to the expansible member 20 or bellows 12 to operate damper 7. Changeover valve 21 senses the temperature of the conditioning medium flowing through heat exchanger 6. With the temperature of the cooling medium below a first predetermined temperature say, for example, 65° F. the air passes through line 29 to the cooling port 31 from which it is bled to the atmosphere. Counterbalance 11 urges damper 7 clockwise as viewed in FIGURE 1 to permit more induced air to pass through heat exchanger 6. The position of the ball seating member is controlled by the cantilevered bimetallic element 72 which senses the temperature of the room air drawn through the thermostat casing 25. As the temperature of the room air approaches a predetermined temperature and cooling requirements decrease, the bimetallic element warps and plate 41 is actuated in a direction which tends to seat ball 52 and decrease the air flow rate through cooling bleed port 31. The pressure upstream of the port will tend to rise. This pressure rise will be felt back through the system to the expansible member where expansion will take place and damper 7 will be moved toward closing the air stream passing through heat exchanger 6, thus bypassing more air through passage 8. When the temperature of the secondary air induced over bimetallic element 72 rises above the preset temperature, the bimetallic element will warp permitting plate 41 to pivot to raise spherical ball 52 and again bleed air to the atmosphere through port 31. The pressure within expansible member 12 will be reduced and damper 7 will be pivoted clockwise under the influence of counterbalance 11 permitting more induced air to flow through heat exchanger 6 and be cooled thereby. It will be noted that when the damper is in an intermediate position, part of the induced air will pass through heat exchanger 6 and the remainder will pass through passage 8.

The thermostat functions similarly under winter operating conditions. When the temperature of the conditioning medium flowing through heat exchanger 6 is above a second predetermined temperature, as for example, 85° F., the changeover valve 21 moves to communicate line 20 with heating line 28. Control air pressure is transmitted through line 19 to the expansible member 12. Control air flows through line 20, changeover valve 21, and line 28 to heating bleed port 30 of thermostat 24. Assuming there is a demand for heating, bimetallic element 72 will be warped in response to the temperature of secondary air passing thereover. Upon a decrease of secondary air temperature, plate 40 will be pivoted in a direction which tends to open bleed port 30 thus increasing the amount of air bled to the atmosphere. Damper 7 will be pivoted clockwise as viewed in FIGURE 1 by counterbalance 11 to permit more secondary air to pass through heat exchanger 6. As the demand for secondary air heating decreases bimetallic element 72 is warped in response to the temperature of the secondary air passing thereover to pivot plate 40. Ball 51 moves in a direction which tends to close port 30. The pressure upstream of the port will rise and the pressure increase will be sensed in expansible member 12 where expansion will take place and damper 7 will be moved to reduce the flow of air through heat exchanger 6 and increase the air bypassing the heat exchanger through passage 8. Thus the dual-bleed thermostat of the present invention is a modulating device during both heating and cooling operation.

The individual adjustment of each bimetallic element may be accomplished at the factory. The vertical shaft may be adjusted by the occupant of the enclosure served by each room unit with which the thermostat is associated to adjust the temperature range within that particular space.

The thermostat of the present invention is adapted for use in non-changeover systems. If, for example, the thermostat is employed only with a cooling system then a connection will be made from the restriction member directly to the cooling port of the thermostat, eliminating the changeover valve.

By the present invention there is provided an improved dual-bleed thermostat of bimetallic design having a means for adjusting the temperature range of each bimetallic element and also having means for simultaneously adjusting the bimetallic elements. Further, the invention provides novel spherically adjustable seating members.

The invention herein described has its principal use in controlling the flow of induced air through or bypassing a room or enclosure, but it will be apparent that certain features of the invention may be utilized in generally controlling the flow of fluid other than induced air for purposes other than the air conditioning of enclosures. It will additionally be understood that various modifications of the invention will be apparent to those skilled in the art without departing from the scope and the spirit of the invention set forth in the following claims.

I claim:

1. A bleed-type control mechanism comprising a support, means defining a bleed port in said support, said bleed port adapted to be connected to a source of control air, an actuator on said support responsive to temperature, and means for controlling the flow of air through said bleed port in response to movement of said actuator, said controlling means including means for closing said bleed port, lost motion means operatively connecting said actuator and said closing means, said closing means comprising a plate having an opening therein, a ball having a planar surface thereon seated in said opening, said planar surface adapted to close said bleed port, and resilient means for retaining said ball in said opening to accommodate adjustment of the planar surface to the plane of the bleed port.

2. A dual-bleed thermostat for use in a control system comprising a frame, a first nozzle on said frame having a planar port, a second nozzle on said frame having a planar port, a bracket pivotally mounted on said frame, a first bimetallic element adjustably secured to said bracket, a second bimetallic element adjustably secured to said bracket, first means operatively connected to said first bimetallic element for closing the first port, second means operatively connected to said second bimetallic element for closing the second port, and means for moving the bracket to simultaneously adjust the first means and the second means.

3. A dual-bleed thermostat as in claim 2 including a first member and a second member, said first bimetallic element affixed to said first member and said second bimetallic element affixed to said second member, means adjustably connecting said first member to said bracket, and means adjustably connecting said second member to said bracket.

4. A dual-bleed thermostat as in claim 3 wherein said first and said second members are angles.

5. A dual-bleed thermostat as in claim 2 including a first angle pivotally connected to said bracket, said first bimetallic element being rigidly secured to said first angle, a second angle pivotally connected to said bracket, said second bimetallic element being rigidly secured to said second angle, and a set screw connecting each of said angles in position relative to said bracket, whereby when each set screw is loosened the respective angle may be adjusted relative to the bracket.

6. A dual-bleed thermostat comprising a support, means defining a first bleed port in said support, means defining a second bleed port in said support, each bleed port adapted to be connected to a source of control air, first means regulating the discharge of control air from said bleed port, second means regulating the discharge of control air from said second bleed port, said first means and said second means each comprising a pivotally mounted lever, one end of which is adapted to control the extent of closure of the associated bleed port, a bracket pivotally mounted on said support, a first bimetallic element cantilevered from said bracket, a second bimetallic element cantilevered from said bracket, first lost motion means connecting said first lever and said first bimetallic element, second lost motion means connecting said second lever and said second bimetallic element, means on said bracket for adjusting the position of each bimetallic element and means on said frame for adjusting the bracket to simultaneously adjust both the first bimetallic element and the second bimetallic element with respect to the first and the second bleed port, respectively.

7. A dual-bleed thermostat comprising a support, means defining a first bleed port in said support, means defining a second bleed port in said support, each bleed port adapted to be connected to a source of control air, first means for regulating the discharge of control air from said first bleed port in response to a first predetermined temperature, second means for regulating the discharge of control air from said second bleed port in response to a second predetermined temperature, said first and said second means each comprising a member for closing said first and second bleed ports, respectively, and a bimetallic element for actuating each of said members, each bimetallic element being affixed to a common member pivotally mounted on said support, a common member pivotally mounted on said support, means for adjusting said first means within a first predetermined temperature range, means for adjusting said second means within a second predetermined temperature range, and means for adjusting said common member to simultaneously adjust said first means and said second means.

8. A dual-bleed thermostat comprising a support, means defining a first bleed port in said support, means defining a second bleed port in said support, each bleed port adapted to be connected to a source of control air, means for regulating the discharge of control air from said first bleed port, a bimetallic element for actuating said first regulating means in response to a first predetermined temperature, means for regulating the discharge of control air from said second bleed port, a bimetallic element for actuating said second regulating means in response to a second predetermined temperature, a bracket pivotally mounted on said support, means for adjustably mounting each of said bimetallic elements on said bracket, and means for simultaneously adjusting said bimetallic elements by moving said bracket.

9. A dual-bleed thermostat as in claim 8 wherein said means for simultaneously adjusting said bimetallic elements comprises a cam follower secured to said bracket and a cam on said support for actuating said cam follower to pivot said bracket.

10. A dual-bleed thermostat comprising a support, means defining a first bleed port in said support, means defining a second bleed port in said support, each bleed port adapted to be connected to a source of control air, means for regulating the discharge of control air from said first bleed port, a bimetallic element for actuating said first regulating means in response to a first predetermined temperature, means for regulating the discharge of control air from said second bleed port, a bimetallic element for actuating said second regulating means in response to a second predetermined temperature, a bracket pivotally mounted on said support, means for adjustably mounting each of said bimetallic elements on said bracket, and means for simultaneously adjusting said bimetallic elements by moving said bracket, each of said regulating means comprising a pivotally-mounted lever operatively connected to a bimetallic element, each of said levers having therein adjacent to a bleed port a spherically adjustable seating member, each spherically adjustable seating member having a surface adapted to control closure of a bleed port, and means retaining said seating members on said levers.

11. A dual-bleed thermostat comprising a support, means defining a first bleed port in said support, means defining a second bleed port in said support, each bleed port adapted to be connected to a source of control air, means for regulating the discharge of control air from said first bleed port, a bimetallic element for actuating said first regulating means in response to a first predetermined temperature, means for regulating the discharge of control air from said second bleed port, a bimetallic element for actuating said second regulating means in response to a second predetermined temperature, a bracket pivotally mounted on said support, means for adjustably mounting each of said bimetallic elements on said bracket and means for simultaneously adjusting said bimetallic elements by moving said bracket, each of said regulating means comprising a plate having an opening therein adjacent the bleed port, a seating member in said opening having a planar face adapted to control closure of the bleed port, and means for retaining the seating member in said opening to accommodate universal adjustment of the planar face of the seating member to close the bleed port.

References Cited in the file of this patent

UNITED STATES PATENTS

| | | |
|---|---|---|
| 1,062,138 | Bayliss | May 20, 1913 |
| 1,773,110 | Meyers | Aug. 19, 1930 |
| 2,120,507 | Otto | June 14, 1938 |
| 2,193,295 | Otto | Mar. 12, 1940 |